(12) United States Patent
Su et al.

(10) Patent No.: US 6,842,200 B1
(45) Date of Patent: Jan. 11, 2005

(54) LIQUID CRYSTAL PANEL HAVING COMPENSATION CAPACITORS FOR BALANCING RC DELAY EFFECT

(75) Inventors: Lee Deuk Su, Taoyuan Hsien (TW); Chung Te-Cheng, Tao-Yuan Hsien (TW); Ming Tien Lin, Tao-Yuan Hsien (TW); Chia Te Liao, Ta-Yuan Hsien (TW)

(73) Assignee: Hannstar Display Corporation, Taipei (TW)

( * ) Notice: Subject to any disclaimer, the term of this patent is extended or adjusted under 35 U.S.C. 154(b) by 0 days.

(21) Appl. No.: 10/464,089

(22) Filed: Jun. 18, 2003

(51) Int. Cl.[7] .................................. G02F 1/1345
(52) U.S. Cl. ..................... 349/38; 349/139; 349/149
(58) Field of Search ............................ 349/38, 39, 43, 349/139, 143, 149, 151, 152; 345/87

(56) References Cited

U.S. PATENT DOCUMENTS

| | | | | |
|---|---|---|---|---|
| 4,787,712 A | * | 11/1988 | Ukai et al. .................. 349/38 |
| 5,714,770 A | * | 2/1998 | Kim .............................. 257/59 |
| 5,760,858 A | * | 6/1998 | Hodson et al. ............... 349/61 |
| 6,104,465 A | * | 8/2000 | Na et al. ..................... 349/152 |

* cited by examiner

Primary Examiner—Toan Ton
Assistant Examiner—Tai Duong
(74) Attorney, Agent, or Firm—Seyfarth Shaw LLP

(57) ABSTRACT

A liquid crystal panel comprises an active matrix substrate, an opposing substrate facing the active matrix substrate, and a liquid crystal layer disposed between the active matrix substrate and the opposing substrate. On the active matrix substrate, a plurality of parallel signal lines and a plurality of parallel scanning lines are arranged for forming a matrix of pixels called an active area. A plurality of pads are formed in outer-lead bonding areas located on the periphery of the active area, and are used for mounting driving devices. Each of the OLB areas is separately connected to one of fan-out areas including a plurality of leads. Each compensation capacitor with a predetermined capacitance is connected to each lead so as to minimize variation of RC delay effect between all leads.

5 Claims, 10 Drawing Sheets

LIQUID CRYSTAL PANEL HAVING COMPENSATION CAPACITORS FOR BALANCING RC DELAY EFFECT

BACKGROUND OF THE INVENTION

1. Field of the Invention

The present invention relates to a liquid crystal panel having compensation capacitors for balancing RC delay effect, and more particularly to a liquid crystal panel with uniform delay times in all control lines.

2. Description of the Related Art

Typically, a liquid crystal panel includes an active matrix substrate 10 having a plurality of data lines 13 and scanning lines 12, and the data lines 13 are perpendicular to the scanning lines 12, as shown in FIG. 1. A plurality of thin film transistors (TFTs) are formed in an active area B in which the data lines 13 and the scanning lines 12 cross each other at right angle.

The data lines 13 and the scanning lines 12 extend out of the active area B for transmitting signals from driving devices. A plurality of pads are formed in outer-lead bonding (OLB) areas 14 located on the periphery of the active area B, and are used for mounting the driving devices. Each of the OLB areas 14 is separately connected to one of fan-out areas 16 including a plurality of leads 15.

FIG. 2 shows an enlarged diagram of portion C in accordance with FIG. 1. The leads 15 run in straight lines and have equal thickness and width. The resistances of the leads 15 are different from each other because the lengths from the most outside lead 151 to middle lead 152 are apparently different, as shown in FIG. 3(a). The resistance of the lead 15 may be calculated as follows:

$$R = \rho \frac{L}{S},$$

where $\rho$, $L$ and $S$ respectively represent resistance, length, and cross sectional area of the lead 15.

The transverse axle in FIG. 3(a) represents the assigned numbers of the leads 15 from the leftmost one to the rightmost one with regard to FIG. 2. Furthermore, FIG. 3(b) shows a graph of the variable capacitances of all the leads 15. The product of resistance R and capacitance C is directly related to the delay time of a signal transmitted by either one of the data lines 13 or one of the scanning lines 12. Therefore, the delay time caused by RC delay effect is variable from the most outside lead 151 to the middle lead 152, as shown in FIG. 3(c).

Unfortunately, the variation of the delay time in the scanning lines 12 gives rise to a flicker phenomenon so as to deteriorate image quality. Therefore, the zigzag configuration of a fan-out area 16' is provided for only reducing the variation of resistances, as shown in FIG. 4. Because all the leads is enclosed by the certain area of the fan-out area 16', the total length of a zigzag middle lead 152' is still shorter than the length of a straight outside lead 151'. In conclusion, the product R×C of the lead 151' is different from that of the lead 152'. That is, the flicker phenomenon also exists in the liquid crystal panel with zigzag leads.

SUMMARY OF THE INVENTION

An objective of the present invention is to provide a liquid crystal panel having compensation capacitors for balancing RC delay effect. Each compensation capacitor with a predetermined capacitance is connected to each lead so as to minimize the variation of RC delay effect between all leads.

In order to achieve the objective, the present invention discloses a liquid crystal panel having compensation capacitors for balancing RC delay effect, which comprises an active matrix substrate, an opposing substrate facing the active matrix substrate, and a liquid crystal layer disposed between the active matrix substrate and the opposing substrate. On the active matrix substrate, a plurality of parallel signal lines and a plurality of parallel scanning lines are arranged for forming a matrix of pixels called an active area.

A plurality of pads are formed in outer-lead bonding (OLB) areas located on the periphery of the active area, and are used for mounting driving devices. Each of the OLB areas is separately connected to one of fan-out areas including a plurality of leads. Each compensation capacitor with a predetermined capacitance is connected to each lead so as to minimize variation of RC delay effect between all leads.

BRIEF DESCRIPTION OF THE DRAWINGS

The invention will be described according to the appended drawings in which.

PREFERRED EMBODIMENT OF THE PRESENT INVENTION

Figure 5:
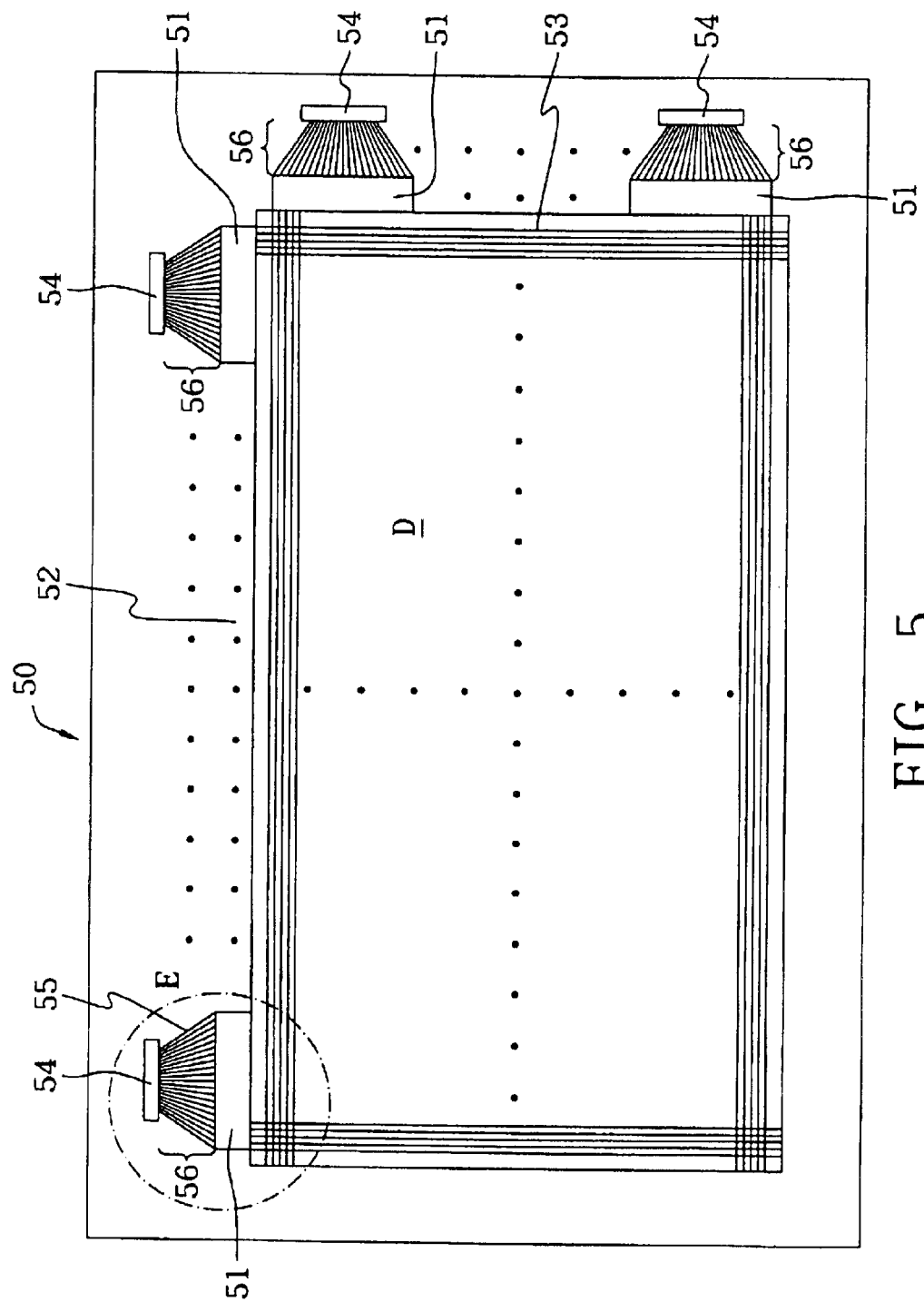
FIG. 5 is a planer view illustrating a configuration of an active matrix substrate in accordance with the present invention.

FIG. 5 is a planer view illustrating a configuration of an active matrix substrate in accordance with the present invention. A liquid crystal panel includes an active matrix substrate 50 having a plurality of data lines 53 and scanning lines 52, and the data lines 53 are perpendicular to the scanning lines 52. A plurality of thin film transistors (TFTs) (not shown) are formed in an active area D in which the data lines 53 and the scanning lines 52 cross each other at right angles. The liquid crystal panel further includes an opposing substrate (not shown) facing the active matrix substrate 50, and a liquid crystal layer (not shown) disposed between the active matrix substrate 50 and the opposing substrate.

The data lines 53 and the scanning lines 52 extend out of the active area D for transmitting signals from driving devices. A plurality of pads are formed in outer-lead bonding areas 54 near the periphery of the active area D, and are used for mounting the driving devices. Each of the OLB areas 54 is separately connected to one of fan-out areas 56. A plurality of leads 55 are enclosed in each of the fan-out areas 56.

Figure 1:
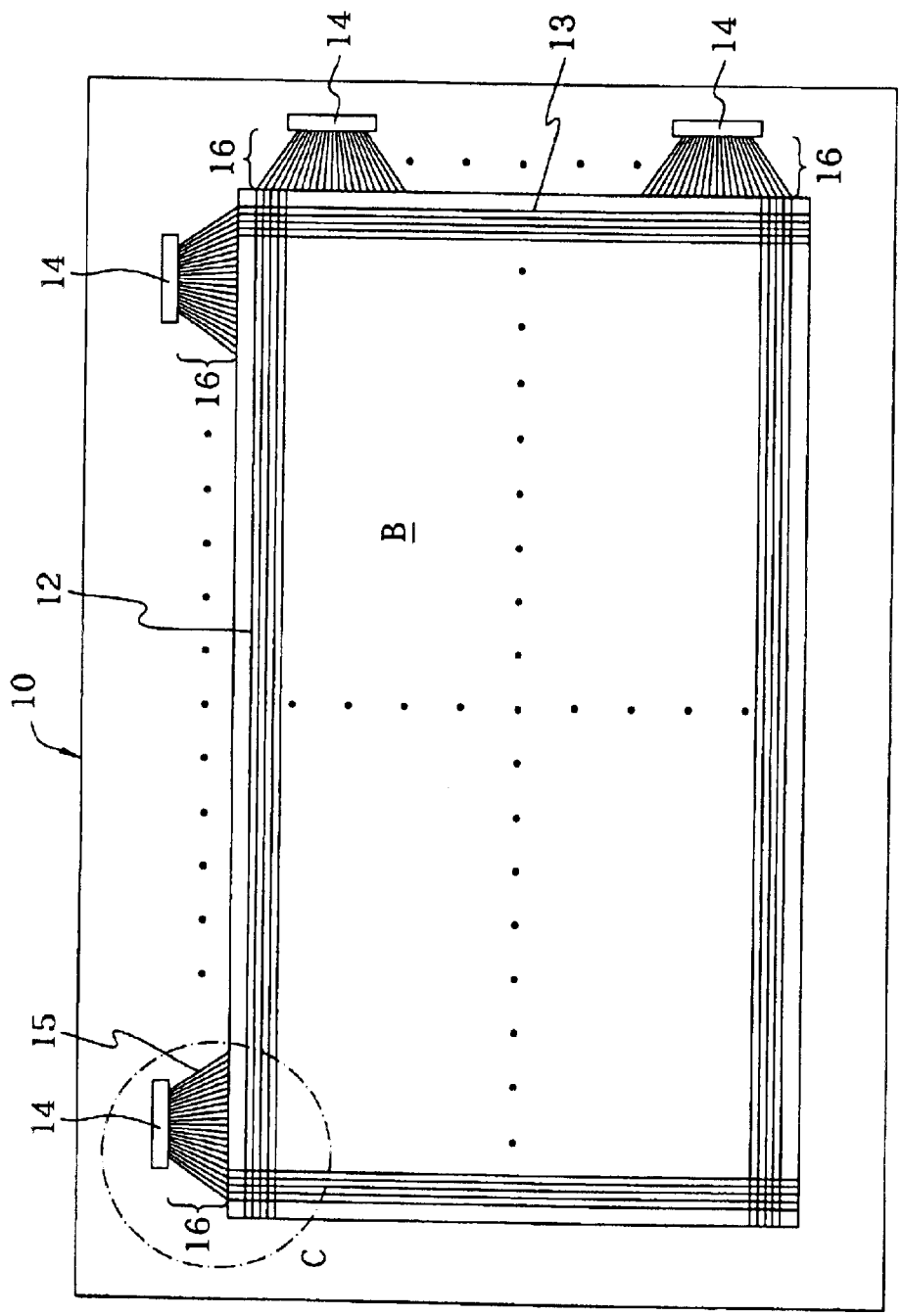
FIG. 1 is a planer view illustrating a configuration of an active matrix substrate in accordance with a prior art reference.
Figure 2:
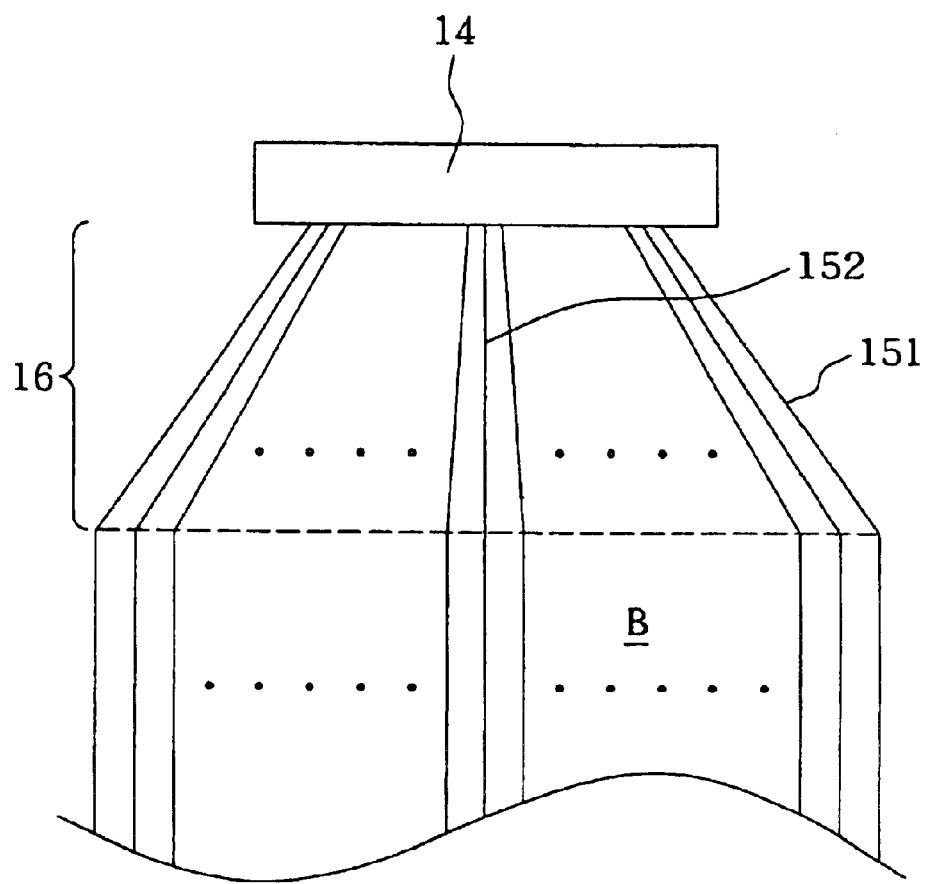
FIG. 2 is an enlarged diagram illustrating portion C of the active matrix substrate in FIG. 1.
Figure 3A:
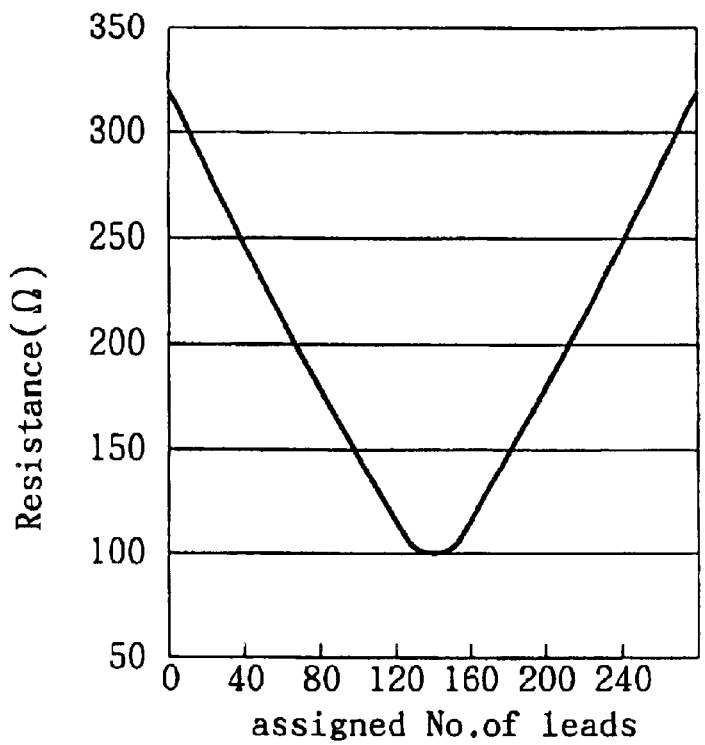
FIG. 3(a) is a graph illustrating variation of resistances of the leads of the fan-out area in FIG. 2.
Figure 3B:
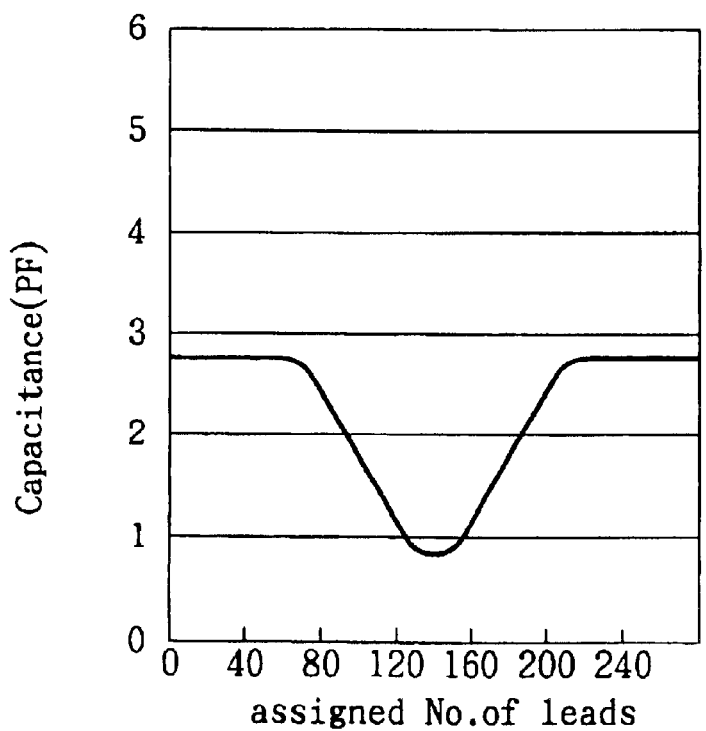
FIG. 3(b) is a graph illustrating variation of capacitances of the leads of the fan-out area in FIG. 2.
Figure 3C:
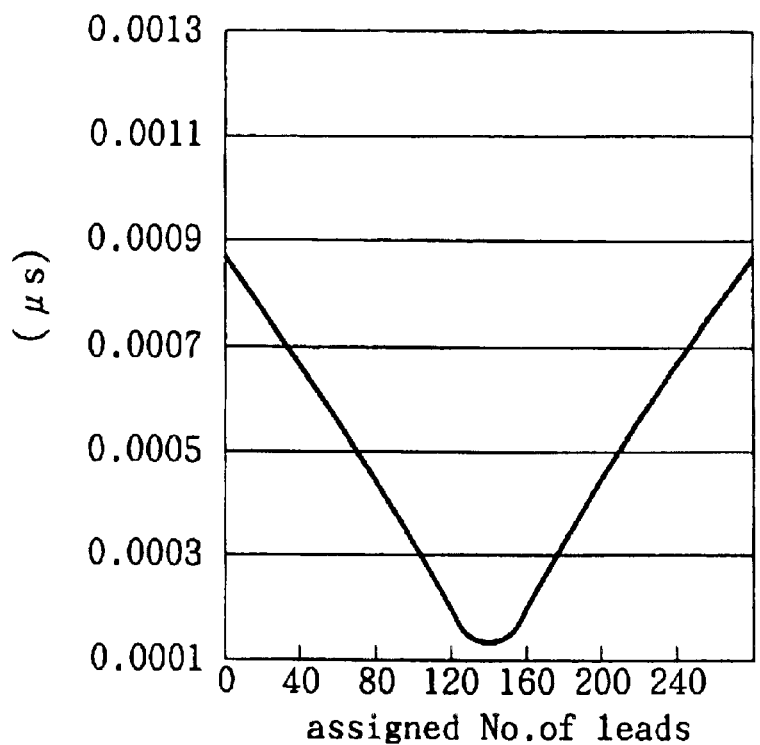
FIG. 3(c) is a graph illustrating variation of the products of resistances and capacitances between all the leads in FIG. 2.
Figure 4:
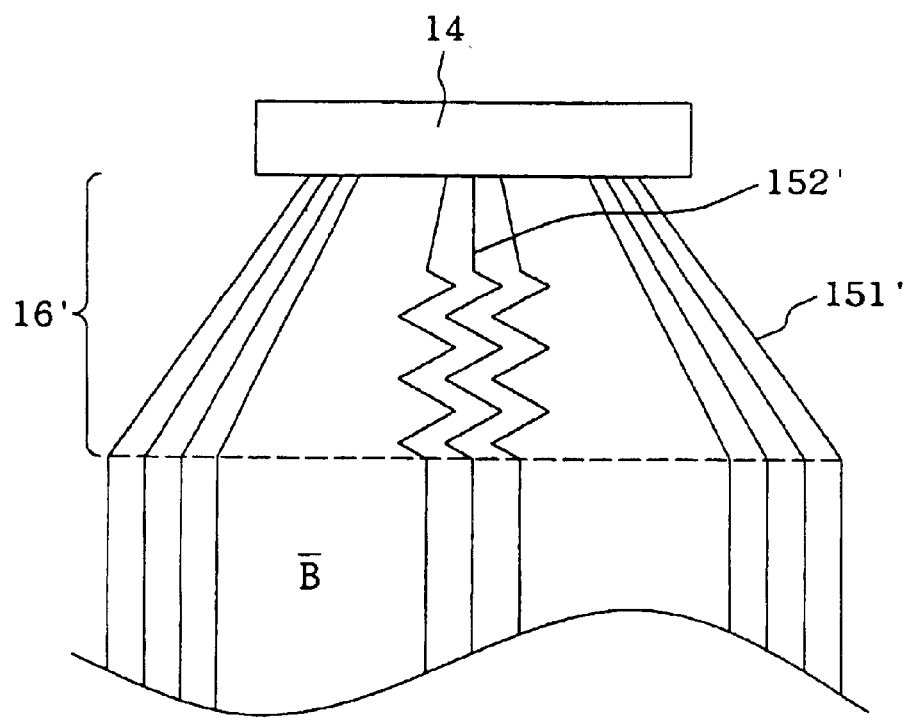
FIG. 4 is a schematic diagram illustrating a fan-out area with a zigzag configuration in accordance with another prior art reference.
Figure 6A:
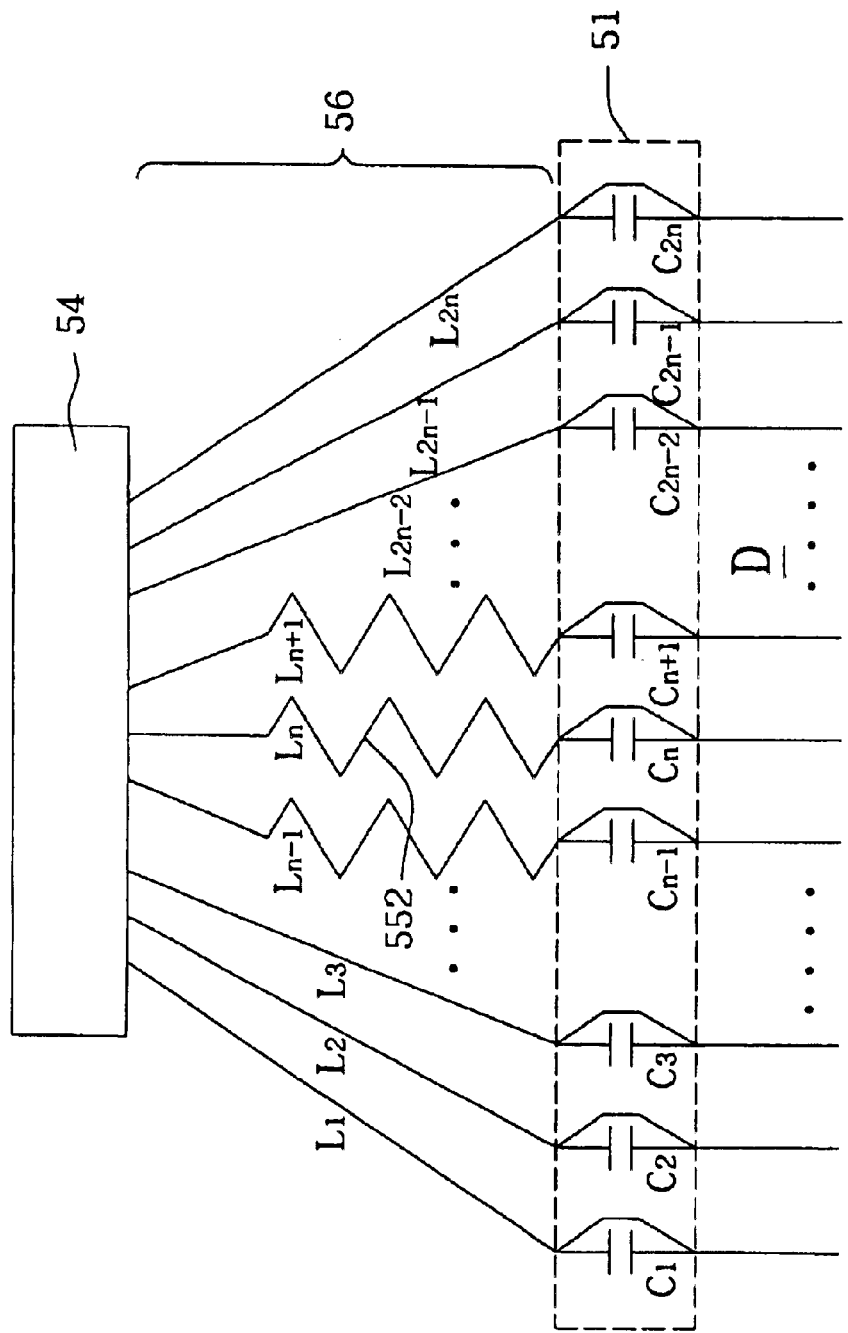
FIG. 6(a) is an enlarged diagram of portion E in FIG. 5 with parallel-connected capacitances.

In comparison with the active matrix substrate 10 in FIG. 1, the active matrix substrate 50 further comprises compensation circuit areas 51 between the OLB areas 54 and the active area D. As shown in FIG. 6, the enlarged diagram of portion E illustrates detailed circuits of the compensation circuit area 51. Each of compensation capacitors $C_1$–$C_{2n}$ is separately connected to each of leads $L_1$–$L_{2n}$ and has its corresponding capacitance predetermined by a circuit simulation. The capacitances of the compensation capacitors $C_1$–$C_{2n}$ have to balance RC delay effect between all the leads $L_1$–$L_{2n}$. That is, variation of the products of resistances and capacitances between all leads is minimized when the adequate compensation capacitors $C_1$–$C_{2n}$ is added to original circuits.

Figure 6B:
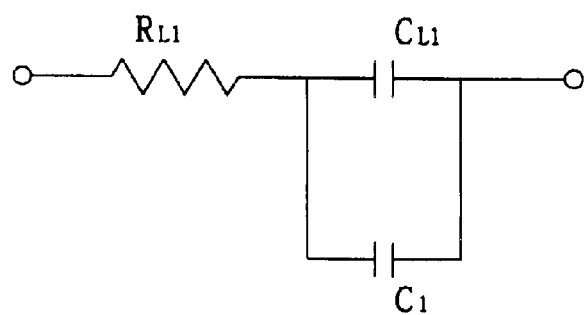
FIG. 6(b) is an equivalent circuit diagram of the lead $L_1$ and the capacitor $C_1$ in FIG. 6(a)

In this case, each of the compensation capacitors $C_1$–$C_{2n}$ is separately connected to corresponding one of the leads $L_1$–$L_{2n}$ in parallel (connection in series is another embodiment). FIG. 6(b) shows an equivalent circuit diagram of the lead $L_1$ and the capacitor $C_1$, wherein $R_{L1}$ and $C_{L1}$ separately represent an equivalent resistance and an equivalent capacitance of the lead $L_1$. The total capacitance $C_T$ of these capacitors in parallel can be present as follows:

$$C_T = C_{L1} + C_1$$

Figure 6C:
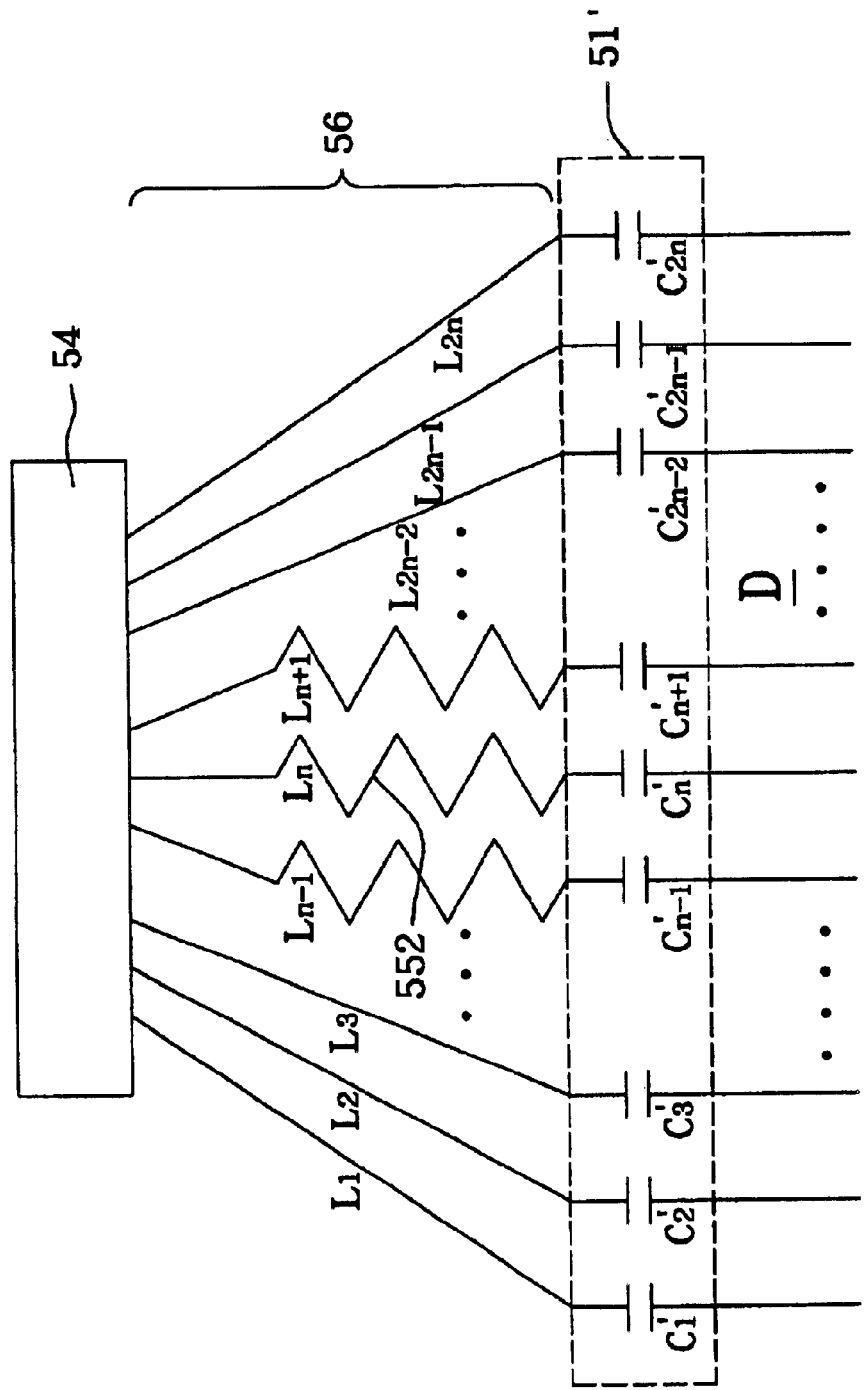
FIG. 6(c) is a diagram similar to that of FIG. 6(a), with series-connected capacitances.

Alternatively, the plurality of lead $L_1$–$L_{2n}$ are connected to the plurality of compensation capacitors $C_1$–$C_{2n}$ located in a compensation circuit area 51' in series, as shown in FIG. 6(c).

Figure 7A:
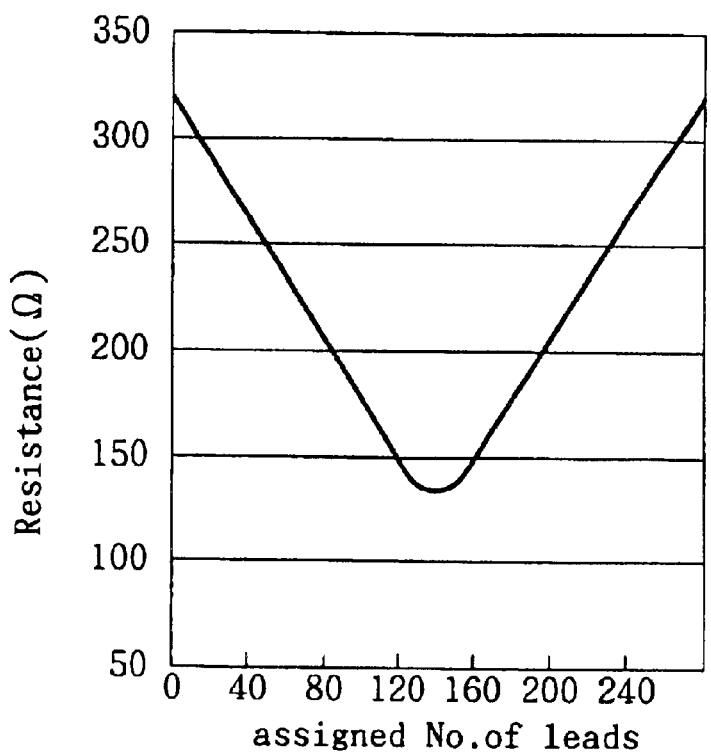
FIG. 7(a) is a graph illustrating variation of resistances of the leads in FIG. 6.

FIG. 7(a) is a graph illustrating variation of the resistances of leads in FIG. 6. The transverse axle in FIG. 7(a) represents the assigned numbers of the leads 55 from the leftmost one $L_1$ to the rightmost one $L_{2n}$ with regard to FIG. 6, wherein $2n$, for example, is equal to two hundred and forty. A minimum resistance appears on a middle lead $L_n$ because the middle lead $L_n$ is shorter than the other leads even though it has a zigzag trace.

Figure 7B:
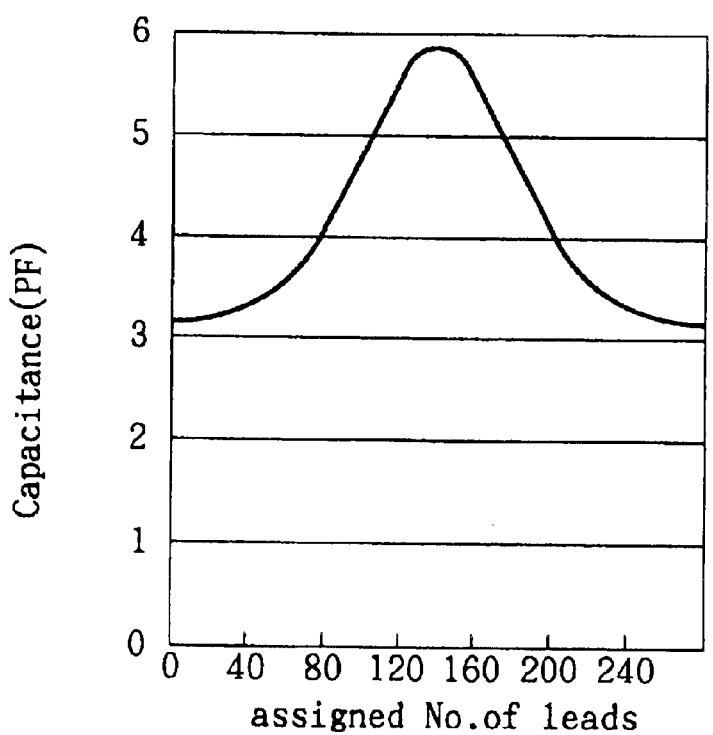
FIG. 7(b) is a graph illustrating variation of capacitances of the leads in FIG. 6.

Apparently, we can determine that a compensation capacitor with a maximum capacitance is connected to the middle lead $L_n$, and one with a minimum capacitance is connected to the most outside lead $L_1$ or $L_{2n}$. FIG. 7(b) is a graph illustrating variation of the predetermined capacitances. From the most outside lead $L_1$ to the middle lead $L_n$, the corresponding capacitances gradually increase in order to balance the RC delay effect of these leads.

Figure 7C:
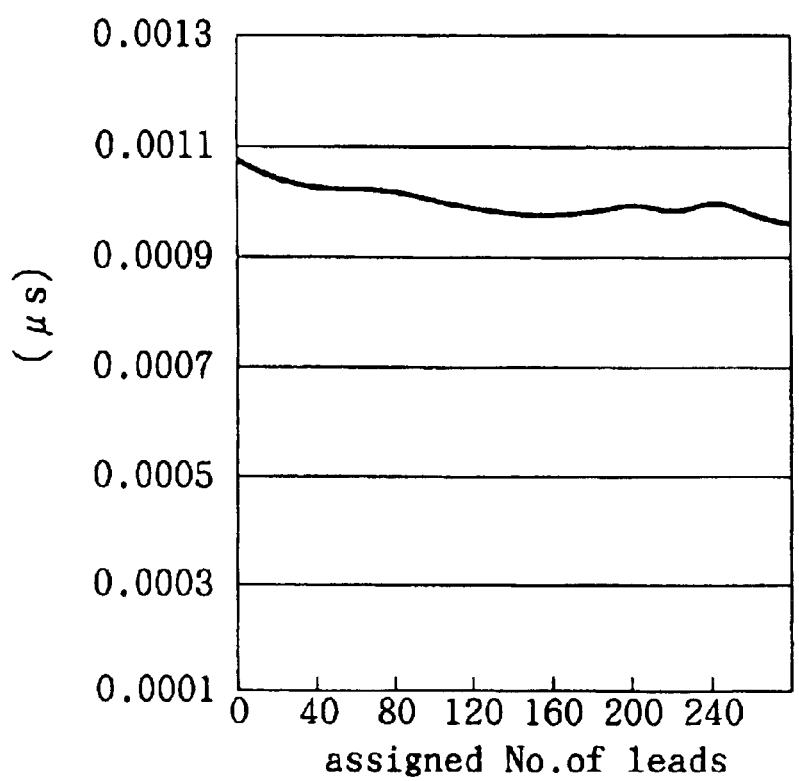
FIG. 7(c) is a graph illustrating variation of the products of resistances and capacitances between all the leads in FIG. 6.

The product of resistance and capacitance is directly related to the delay time of a signal transmitted by one of the data lines 53. FIG. 7(c) is a graph illustrating variation of the products of resistances and capacitances between all leads in FIG. 6. From the leftmost lead $L_1$ to the rightmost lead $L_{2n}$, the products of resistances and capacitances regarding all these leads are uniform. Therefore, the RC delay effect of these leads are similar, and flicker phenomenon is reduced due to minimizing the difference of the delay times between each other.

The above-described embodiments of the present invention are intended to be illustrative only. Numerous alternative embodiments may be devised by persons skilled in the art without departing from the scope of the following claims.

What is claimed is:

1. A liquid crystal panel having compensation capacitors for balancing RC delay effect, comprising:

a substrate;

a plurality of data lines;

a plurality of signal lines crossing the plurality of data lines so as to form a plurality of pixels on the substrate;

at least one outer-lead bonding area formed on the substrate, the outer-lead bonding area including a plurality of bonding pads therein;

a plurality of leads each having a resistance for connecting the plurality of bonding pads to the plurality of signal lines or data lines; and a plurality of compensation capacitors having electrodes, all of which electrodes are connected to the plurality of leads, each capacitor having a capacitance and there being a product of resistance and capacitance for each lead, the capacitances being such that differences among the products are minimized.

2. The liquid crystal panel having compensation capacitors for balancing RC delay effect of claim 1, wherein the plurality of leads are connected to the plurality of compensation capacitors in series.

3. The liquid crystal panel having compensation capacitors for balancing RC delay effect of claim 1, wherein the plurality of leads are connected to the plurality of compensation capacitors in parallel.

4. The liquid crystal panel having compensation capacitors for balancing RC delay effect of claim 1, wherein the plurality of leads have straight traces.

5. The liquid crystal panel having compensation capacitors for balancing RC delay effect of claim 1, wherein the plurality of leads have zigzag traces.

* * * * *